US00RE40399E

(19) United States
(12) Reissued Patent
Hugenroth et al.

(10) Patent Number: US RE40,399 E
(45) Date of Reissued Patent: Jun. 24, 2008

(54) LOW CHARGE PROTECTION VENT

(75) Inventors: Jason J. Hugenroth, Baton Rouge, LA (US); Thomas R. Barito, Arkadelphia, AR (US)

(73) Assignee: Scroll Technologies, Arkadelphia, AR (US)

(21) Appl. No.: 10/387,037

(22) Filed: Mar. 12, 2003

Related U.S. Patent Documents

Reissue of:
(64) Patent No.: 6,210,120
Issued: Apr. 3, 2001
Appl. No.: 09/272,439
Filed: Mar. 19, 1999

(51) Int. Cl.
*F04B 49/10* (2006.01)

(52) U.S. Cl. ..... 417/32; 417/310; 417/26
(58) Field of Classification Search ..... 417/310, 417/32, 25, 26, 222.1
See application file for complete search history.

(56) References Cited

U.S. PATENT DOCUMENTS

| | | | | |
|---|---|---|---|---|
| 4,388,630 | A | | 6/1983 | Osaki et al. |
| 5,169,294 | A | | 12/1992 | Barito |
| 5,452,989 | A | | 9/1995 | Rood |
| 5,707,210 | A | | 1/1998 | Ramsey et al. |
| 6,132,179 | A | * | 10/2000 | Higashiyama ..... 417/310 |

* cited by examiner

*Primary Examiner*—William H. Rodriguez
(74) *Attorney, Agent, or Firm*—Carlson, Gaskey & Olds

(57) ABSTRACT

A vent is included into a scroll compressor for protecting a refrigerant system in the event of loss of charge. The vent selectively taps an entrapped compression chamber to a housing chamber which surrounds the motor. In the event of a low charge, the gas in the compression chamber will be at a high temperature, and will heat the motor when the vent opens. The vented heated gas will then actuate a temperature protection device on the motor, causing the motor to stop rotation. In further embodiments, the compression chamber which supplies the tapped fluid is the discharge port.

31 Claims, 4 Drawing Sheets

LOW CHARGE PROTECTION VENT

Matter enclosed in heavy brackets [ ] appears in the original patent but forms no part of this reissue specification; matter printed in italics indicates the additions made by reissue.

BACKGROUND OF THE INVENTION

This invention relates to a scroll compressor with a vent to protect a refrigerant system during a low charge situation.

Compressors are utilized to compress a refrigerant in a air conditioning, refrigeration or heat pump systems, in a refrigerant cycle, the refrigerant leaving the compressor typically passes to a condenser, and from the condenser to an expansion device. From the expansion device the refrigerant is passed to a evaporator, and then to the compressor. During this cycle through the system, a working fluid is cooled, as known.

At times, a refrigerant system may lose charge, or refrigerant mass, such as by leakage. When this happens, the liquid which typically passes through the expansion device could be a gas. When gas approaches the expansion device, the flow may be choked at the expansion device. This could result in significant reduction in the mass flow rate through the system.

The reduction of refrigerant flow causes the compressor to draw the suction side pressure to abnormally low levels. Abnormally low suction pressure levels can cause the compressor to see undesirably high pressure ratios. The combined effect of the high pressure ratios and the low mass flow rate will cause the compressor to run at abnormally high temperatures, which could damage the compressor.

Motors in the compressor are typically provided with a protection device which will shut the compressor motor down in the event of an unusually high temperature. However, by the time the motor senses this unusually high temperature through low charge as described above, damage could already have occurred in the compressor.

One type of compressor is a Scroll compressor. Scroll compressors are becoming widely utilized in refrigerant compression applications. A scroll compressor consists of a first scroll member having a base and a generally spiral wrap extending from the base. This first scroll member has its wrap interfitting with the wrap of the second scroll member to define compression chambers. The first scroll member is driven to orbit relative to the second scroll member, and entrapped fluid in the chambers is compressed to compress an entrapped fluid.

SUMMARY OF THE INVENTION

In the disclosed embodiment of this invention, a compressor is provided with a vent that passes a heated entrapped fluid from a compression chamber to the suction chamber in the event of conditions which evidence a low charge. The compressor is of the hermetically sealed type wherein the suction fluid is passed over the motor to cool the motor. The motor is exposed to the entrapped fluid. The hot entrapped fluid will not cool the motor, but instead heats the motor. This will trip the protection device for the motor, and allow the motor to stop the system, until the low charge situation can be corrected.

In disclosed embodiments of this invention, the vents are incorporated into a Scroll compressor. The vents are preferably placed in the base of the non-driven scroll member. In one embodiment, the vent includes a valve housing at the tap to the compression chamber, and having a valve for selectively closing the tap. The valve is normally spring-biased to a position at which flow is allowed to pass from the compression chamber to the suction chamber. Thus, the valve tends to allow the entrapped fluid to enter the suction chamber, and contact the motor.

The valve is exposed to the entrapped fluid on a side of the valve opposite to the spring bias. The spring bias side of the valve is exposed to suction pressure. In the low charge situation described above, the pressure differential between the suction pressure and pressure at the entrapped fluid is relatively small. This relatively small difference in pressure is not enough to overcome the force of the spring. Thus, the spring will bias the valve to the open position and the heated fluid is allowed to pass from the compression chamber to the suction chamber.

On the other hand, during normal operation, the pressure at the entrapped fluid is significantly higher than the pressure in the suction chamber. Thus, the fluid in the compression chamber is able to overcome the spring force and move the valve to a closed position.

In a second embodiment, a magnetic force holds the valve at its open position allowing flow from the compression chamber to the suction chamber. If compressor operation is proper, and there is a significant pressure differential between suction and the compression chamber, the valve is driven away from its open position by the pressure in the compression chamber and moves to the closed position.

In another embodiment, the spring-biased embodiment is provided with a bi-metal disc which snaps between two positions due to the temperature. If the compressor is included in a heat pump, there are times when the pressure change between suction and the compression chamber might be relatively small. In particular, when the compressor is in a heat pump mode with a low ambient temperature, the suction pressure may become very low, as described above. This could occur at temperatures on the order of −20° F. In these situations it would not be desirable for the motor to stop.

The compressor running in the heat pump situation described above remains relatively cool. The bi-metal disc has a non-heated position which holds the valve at its closed position whenever a very low temperature is experienced. Thus, during the heat pump operation described above the bi-metal disc holds the valve closed, and there is no venting. On the other hand, at almost all normal operating temperatures, the bi-metal disc will not prevent the valve from moving. Thus, during the loss of charge situation described above, the compressor quickly heats. The bi-metal disc will be at its normal position allowing valve movement. The spring force then causes the valve to move to its open position. In this way, the bi-metal disc allows the system to be incorporated into a compressor utilized in a heat pump.

In a further embodiment, a spool valve is provided with a closure valve. The spool valve sees suction pressure on one side and the entrapped pressure on another side. A spring tends to bias the closure valve to an open position allowing the entrapped pressure to move into the suction chamber. Discharge pressure is also provided at one small surface on the valve. If the pressure differential between suction and the compression chamber become small, the spring opens the closure valve, and allows flow from the compression chamber, and further from the discharge chamber into the suction chamber.

In further embodiments, the valve moves to open a tap between discharge and suction when the pressure difference between suction and the compression chamber is small.

Again, a small pressure difference between suction and intermediate is indicative of loss of charge. Thus, the heated gas from the discharge chamber is communicated into the suction chamber, which in turn contacts the motor.

With regard to any of the above embodiments, a heated entrapped gas is passed into a chamber which communicates with the motor. This heats the motor, causing the motor's heat protection circuit to trip and stop motor operation.

While the disclosed embodiments all show the vent in the base of the orbiting scroll, it should be understood that the vent could be located in other locations within the compressor housing. As examples, the vent could be located within the orbiting scroll, or the crank case. Further the vent could be located in a location other than the base of the scroll members.

These and other features of the present invention can be best understood from the following specification and drawings, the following of which is a brief description.

DETAILED DESCRIPTION OF THE PREFERRED EMBODIMENT

Figure 1A:
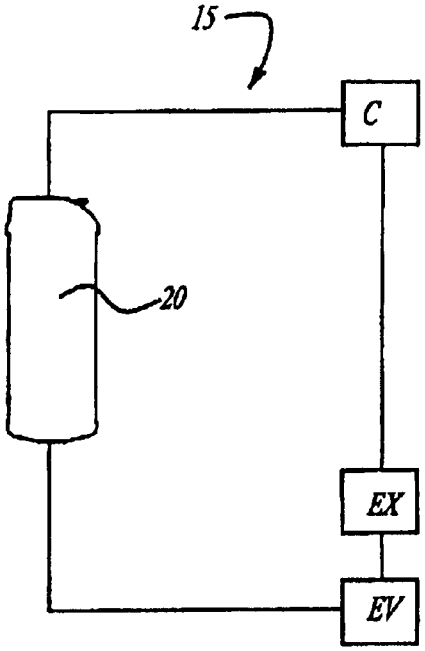
FIG. 1A is a schematic view of a refrigerant system.

A refrigerant system 15 is schematically illustrated in FIG. 1A. A compressor 20 supplies a compressed refrigerant to a condenser C. From the condenser C refrigerant flows to an expansion device EX. From the expansion device the refrigerant flows to an evaporator EV. From the evaporator EV the refrigerant returns to the compressor 20.

As described above, in a loss of charge situation, the liquid which typically leaves the condenser C could still be gaseous. The gas creates a choked flow condition at the expansion device EX, thus limiting mass flow. This could then lead to a problem at the compressor.

Figure 1B:
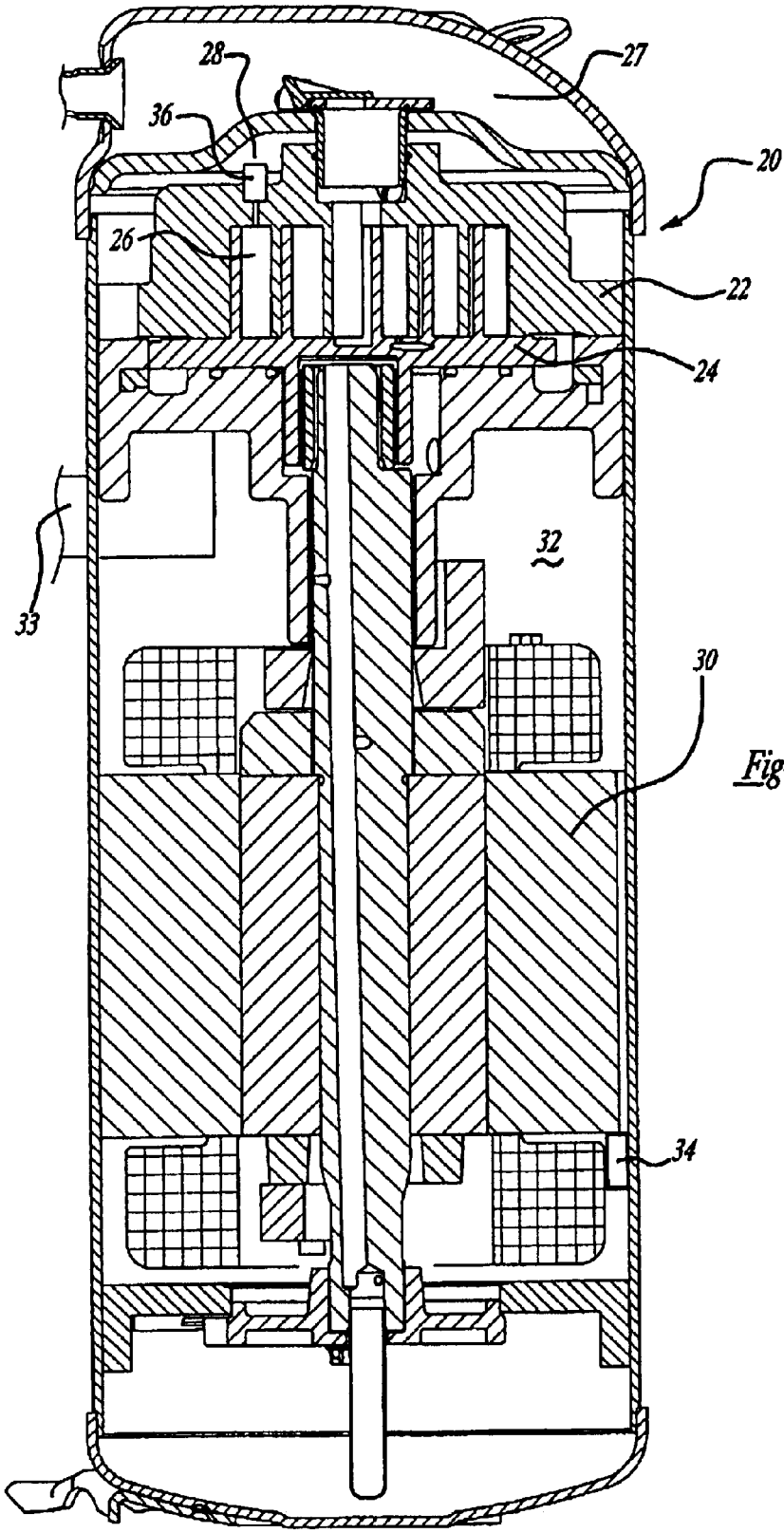
FIG. 1B is a cross-sectional view through a compressor incorporated into the FIG. 1A system.

FIG. 1B is a schematic view of the compressor 20. In this embodiment, the compressor is a scroll compressor, however, the invention may have application to other type compressors. A scroll compressor includes a non-orbiting scroll 22 and an orbiting scroll 24. A chamber 26 is defined between the wraps of the non-orbiting scroll 22 and the orbiting scroll 24. Chamber 26 is selected to be at a location where the refrigerant would be at least partially compressed. A discharge chamber 27 is formed above the non-orbiting scroll 22. A suction chamber 28 surrounds the scrolls 22, 24, and communicates with a suction chamber 32 adjacent a motor 30. Gas passing into a suction inlet 33 is allowed to flow over the motor, cooling the motor. In the event the motor reaches a predetermined temperature, a protection device 34 senses an undesirably high temperature and stops the motor.

As mentioned above, if a low charge situation occurs, there could be undesirably high pressure ratios and undesirable heat encountered in the compression chambers, such as chamber 26. A vent 36 is provided to vent the heated fluid from the chamber 26 into the suction chambers 28, 32. The heated fluid communicates with the motor 30, and the protection device 34 will stop motor operation. This allows the system to be shut down in a low charge situation without damage to the compressor.

Figure 2A:
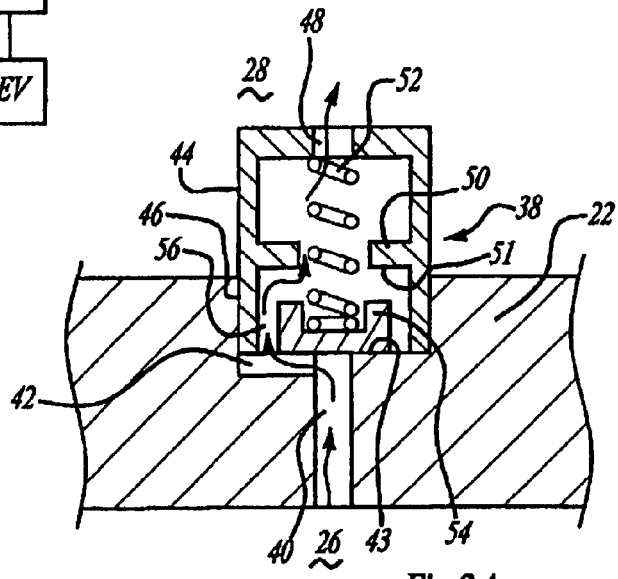
FIG. 2A shows a first vent embodiment.

FIG. 2A shows a first embodiment 38 of the vent 36. A tap 40 to the chamber 26 extends through the non-orbiting scroll 22. A groove 42 is formed into a face 43. A valve housing 44 is placed within an opening 46 in the non-orbiting scroll 22. An opening or passage 48 extends through the valve housing 44 and communicates to the suction chamber 28.

A stop surface 50 provides a valve seat 51. A spring 52 biases a valve 54 downwardly toward end wall 43. In the position illustrated in FIG. 2A, gas can flow from chamber 26 through passage 40, groove 42, around the outer periphery 56 of the valve 54, and through passage 48 into suction chamber 28.

Figure 2B:
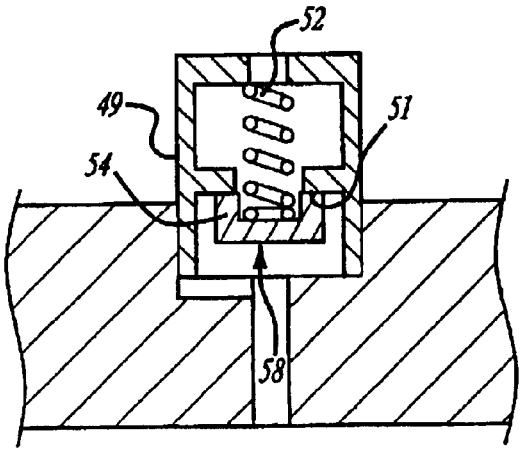
FIG. 2B shows the first vent embodiment in its closed position.

FIG. 2B shows the same valve 54 having been biased to a position 58 where it abuts valve seat 51. In this position, gas cannot flow past the valve 54, and does not flow from the chamber 26 into the chamber 28. During normal operation of the compressor, the pressure in chamber 26 is sufficient to overcome the spring force from spring 52, and valve 54 remains at the position 58. However, during the low charge situations described above, the pressure in the chamber 26 will not be significantly higher than the pressure in chamber 28. Thus, the valve will not be driven against the force of the spring 52. Instead, the spring 52 will maintain the valve 54 in the open position such as shown in FIG. 2A. In this position, the gas from the chamber 26 will communicate with the motor 30, and the motor protection device 34 stops motor operation.

Figure 3:
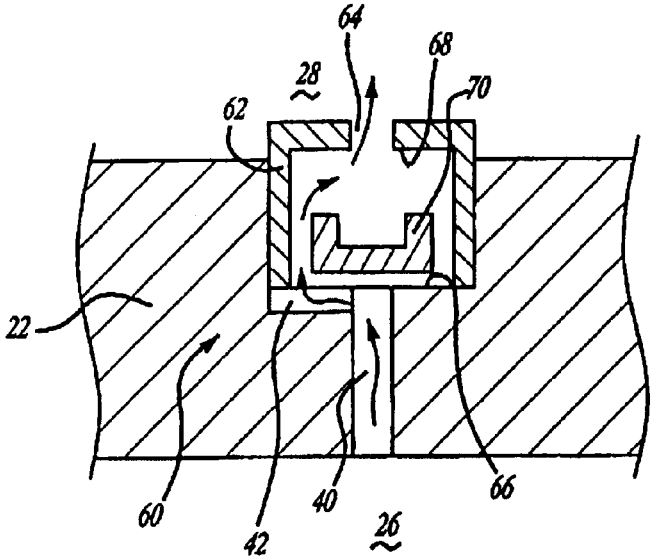
FIG. 3 shows a second embodiment vent system.

FIG. 3 shows another embodiment 60 wherein the valve housing 62 is formed of a non-magnetic material. However, a ferromagnetic surface 66 is spaced from a valve set 68 of the housing 62. An opening 64 extends through housing 62 to the chamber 28. Valve 70 is formed of a magnetic material. Valve 70 is held in contact with the surface 66 due to the magnetic attraction. If the pressure difference between the chamber 26 and the suction chamber 28 is low, the valve 70 remains in the illustrated position and gas flows around the valve 70 through the groove 42. Motor operation is then stopped. However, during normal operation, the magnetic force is overcome by the pressure differential between the chambers 26 and 28 and valve 70 moves to a position abutting valve seat 68. Gas does not flow to the chamber 28 from the chamber 26.

Figure 4:
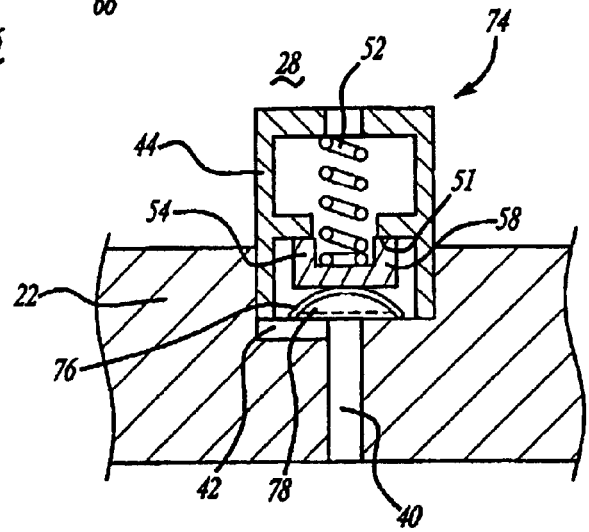
FIG. 4 shows a third embodiment vent system.

FIG. 4 shows another embodiment 74. Embodiment 74 is very similar to the embodiment shown in FIG. 2A, however, a bi-metal disc 76 is included. Bi-metal disc 76 is shown in its cold or relaxed position at which it is bowed. In this position, it holds valve 54 at the closed position 58. Bi-metal disc 76 is of the type of material which snaps to a second position, shown in phantom at 78, if it exceeds a predetermined temperature. Thus, should the compressor reach a predetermined temperature, the bi-metal disc 76 snaps to the position 78. In this position, spring 52 forces valve 54 downwardly. Thus, the heat pump situation as described above will not cause a "false" reading of a low charge situation that will inadvertently and undesirably stop compressor operation. It should be understood that the temperature for disc 76 to move to position 78 is low. Thus, during normal operation, the disc 76 is at position 78.

Figure 5:
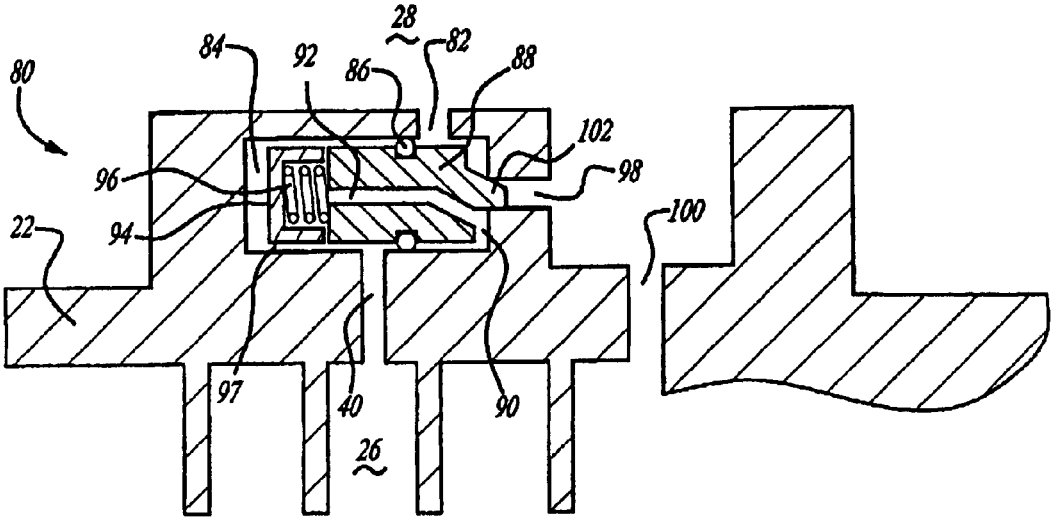
FIG. 5 shows a fourth embodiment vent system.

FIG. 5 shows another embodiment 80. A tap or opening 82 to suction 28 is positioned above a valve spool chamber 84. A seal 86 on a valve spool 88 defines two chambers. A first chamber 90 communicates with the suction chamber 28 through the opening 82. A tap 92 extends through the valve spool 88 and communicates with a rear surface of a closure valve member 94. Closure valve member 94 is spring-biased by spring 96 toward a chamber 97. Chamber 97 communicates with opening 40 to chamber 26. Thus, chamber 97 is generally at the entrapped pressure in chamber 26. A tap 98 to discharge from outlet 100 is normally closed by a valve portion 102. During normal operation of the compressor, the pressure in chamber 97 is sufficiently high such that it overcomes the force of the spring 96 and maintains the closure valve 94 closed, closing passages 92 and 98. Thus, the gas in the chamber 90 is suction pressure gas. The pressure in chamber 97 is sufficiently high to maintain the spool valve 88 in the position such that portion 102 maintains tap 98 closed.

However, if the pressure in the chamber 26 becomes low, spring 96 moves the closure piston 94 to the left from the illustrated position. Pressure in the entrapped chamber 26 communicates through passage 92 to chamber 90. The fluid can then pass into the suction chamber 28. Also, the pressure from tap 98, combined with the force from the chamber 90, causes the spool valve 88 to move to the left from the illustrated position. Gas from the discharge chamber may then pass through port 98, into port 82, and to the suction chamber 28. Again, this heated gas communicates with the motor, and causes the motor protection device to shut down.

In addition, the FIG. 5 embodiment could be arranged and designed such that when the valve 88 moves to the left, it sandwiches the valve 94 against the left wall of the chamber 97. In this way, the tap 92 is not open. Thus, the compression chamber 26 may remain isolated from the discharge chamber 98. In such an application, only pressure from the discharge tap 98 would be communicated to the suction tap 82. Again, the differences between these two functional embodiments of FIG. 5 would be well with the skill of a worker in the art given the above description. The valve movement and relative cross-sectional areas of the valves 88 and 94 would be easily modified to achieve these alternative functions.

Figure 6:
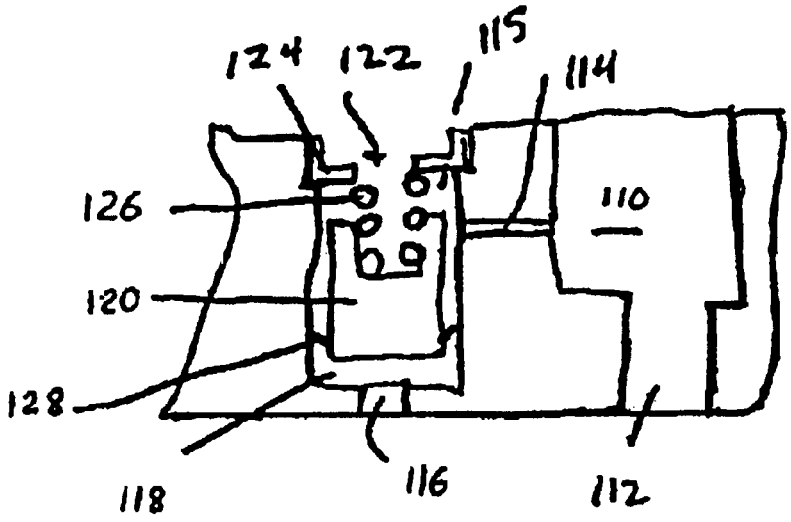
FIG. 6 shows a fifth embodiment vent system.

FIG. 6 shows another embodiment wherein the discharge tap 110 communicates with the discharge port 112. A tap 114 communicates the chamber 110 to a valve chamber 115. Valve chamber 115 also communicates with a tap 116 to a compression chamber. A bottom area 118 below a valve 120 is isolated from the tap 114. A tap 122 to suction extends through a stop 124. Stop 124 provides a stop surface for a spring 126. A seal 128 in the outer periphery of the valve 120 seals between chambers 115 and 118. When the difference between the pressure in compression chamber 116 and the suction pressure through tap 122 is small, and is thus indicative of loss of charge. The spring 126 moves the valve 120 downwardly. With this downward movement, the tap 114 is allowed to communicate to the tap 122 and the heated gas is communicated into the suction chamber.

Alternately, when there is a proper charge, the pressure at tap 116 is sufficiently greater than the pressure at tap 122 to cause the piston 120 to move upwardly and close any communication between the tap 114 and the tap 122.

Figure 7:
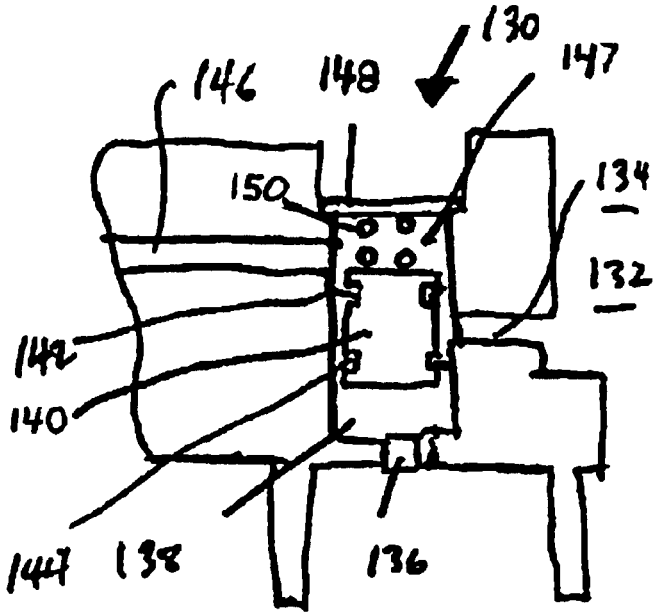
FIG. 7 shows a sixth embodiment vent system.

FIG. 7 shows another embodiment when the discharge port 132 communicates to tap 134 to the area surrounding a valve piston 140. Seals 142 and 144 define a chamber around the outer periphery of the valve 140 in the illustrated position. A tap 136 to a compression chamber communicates with an area 138 beneath the piston 140. A tap 146 to suction extends into a chamber 147 beneath a valve stop 148. A stop 148 provides a bias surface for the spring 150. As with the previous embodiment, when a loss of charge situation occurs, the pressure difference between taps 146 and 136 is small. Thus, the spring 150 can move the valve 140 downwardly from the illustrated position. The tap 134 can then communicate with the tap 146. During normal operation, the pressure in tap 136 exceeds the pressure at tap 146 and the valve 140 is thus driven upwardly preventing flow between taps 134 and 146.

The embodiment shown in FIGS. 6 and 7, and the second alternative embodiment of FIG. 5 all relate to systems wherein the discharge pressure tap is what is communicated back into the suction chamber. For purposes of the claims of this application, the term "compression chamber" and "tapping from a compression chamber" can be interpreted to either be met by the discharge port, or one of the compression chambers prior to discharge.

In general, specific embodiments have been illustrated for allowing a venting of an entrapped gas to the suction chamber in the event that conditions indicate the compressor may be running at a low charge condition. While the embodiments all show the venting device in the non-orbiting scroll, it is possible the vent could be positioned elsewhere. The vent could be in the orbiting scroll, the crankcase, or other locations. Further, it may be valuable to include such a vent in a compressor type other than a scroll compressor. Again, this invention extends beyond the specific embodiments.

In addition, although in the preferred embodiment the heated gas from the compression chamber does shut down the motor, the venting itself will also serve to relieve detrimental affects of the low charge situation. Thus, in some applications, the venting could be utilized without exposing the motor to the heated gas from the compression chamber, or without the motor protection feature.

A worker of ordinary skill in this art would recognize that many modifications come within the scope of this invention. For that reason, the following claims should be studied to determine the true scope and content of this invention.

What is claimed is:

1. A compressor comprising:

a motor for driving a compressor element;

a protection device for said motor, said rotation device being actuated [if] *when* a predetermined temperature is exceeded at said motor;

a housing for enclosing said motor, said housing defining a housing chamber housing said motor;

a compression chamber for compressing a refrigerant, and said refrigerant passing through said housing chamber to said compression chamber, such that said refrigerant cools said motor; and a vent for selectively communicating a fluid directly from an intermediate pressure portion of said compression chamber to said housing chamber, [if] *when* conditions in a chamber intermediate a suction chamber and a discharge port occur because of a loss of charge in a system associated with said compressor, said vent allowing gas at an elevated temperature to move into said housing chamber and contact said motor, and actuate said protection device.

2. A compressor as recited in claim 1, wherein said compressor is a scroll compressor.

3. A compressor as recited in claim 2, wherein said vent is placed in a non-orbiting scroll of said scroll compressor.

4. As recited in claim 1, wherein said vent communicates with a discharge port.

5. A scroll compressor as recited in claim 4, wherein a valve is moveable dependent on the pressure difference between a suction tap and a tap to a compression chamber prior to discharge to selectively communicate said discharge pressure tap to said housing chamber.

6. A scroll compressor comprising:

a housing defining a housing chamber;

an electric motor received in said housing chamber, said electric motor being provided with a protection device which is actuated when said motor reaches a predetermined temperature to stop rotation of said motor;

a supply of suction fluid communicating with said housing chamber such that said suction fluid cools said motor;

a first scroll member having a base and a generally spiral wrap extending from said base and a second scroll member having a base and a generally spiral wrap extending from said base, said wraps of said first and second scroll members interfitting to define compression chambers;

said motor driving said first scroll member to orbit relative to said second scroll member; and a vent for selectively venting gas directly from an intermediate pressure portion of said compression chambers to said housing chamber, [in the event that] *when* conditions in a chamber intermediate a suction chamber and a discharge port occur because of a loss of charge in a system associated with said compressor.

7. A scroll compressor as recited in claim 6, wherein said vent is mounted in said base of said second scroll member.

8. A scroll compressor as recited in claim 7, wherein a tap from said at least one compression chamber selectively passes to said housing chamber, said tap being selectively closed by a valve, said valve being held at a position allowing flow from said tap to said housing chamber, and said valve moving to a position blocking flow from said tap to said housing chamber if a pressure differential between the pressure in said compression chamber and said housing chamber exceeds a predetermined differential.

9. A scroll compressor as recited in claim 8, wherein a spring biases said valve toward a stop surface and to said position allowing flow from said tap to said housing chamber, and the pressure in said compression chamber selectively overcoming said spring force to move said valve to a position blocking flow from said tap to said housing chamber.

10. A scroll compressor as recited in claim 8, wherein a magnetic force holds said valve at a position allowing flow from said tap to said housing chamber, and the pressure in said compression chamber selectively overcoming said magnetic force and moving said valve to a position blocking flow from said tap to said housing chamber.

11. A scroll compressor as recited in claim 8, wherein a temperature sensitive element is associated with said valve, and holds said valve at a position blocking flow from said tap to said housing chamber until a predetermined temperature is exceeded at said element, said element being of a bi-metal composition which snaps to a second position once a predetermined temperature has been exceeded, said valve being capable of moving to said position allowing flow when said bi-metal element has moved to said second position.

12. A scroll compressor as recited in claim 8, wherein a temperature sensitive element is associated with said valve and holds said valve at a position blocking flow from said tap to said housing chamber until a predetermined temperature is exceeded at said element.

13. A scroll compressor as recited in claim 8, wherein said valve includes a spool valve and a closure valve, said pressure in said compression chamber communicating to a chamber acting on said closure valve and causing said closure valve to be biased toward said spool valve, an opposed side of said spool valve being communicated to said housing chamber pressure, and said closure valve being spring-biased to allow flow from said compression chamber to said opposed side of said spool valve, said compression chamber force biasing said closure valve to a first position blocking such flow unless the difference in pressure between said compression chamber and said housing chamber is less than a predetermined difference.

14. A scroll compressor as recited in claim 13, wherein said spool valve selectively closes a tap to discharge pressure when held in said first position, but allows flow from both said compression chamber and a discharge pressure tap when moved away from said first position.

15. A scroll compressor as recited in claim 13, wherein said spool valve selectively closes a tap to discharge pressure when held in said first position but allows flow from said discharge pressure tap when moved away from said first position.

16. A scroll compressor as recited in claim 6, wherein said compression chamber is a discharge port.

17. A scroll compressor as recited in claim 16, wherein a valve is moveable dependent on the pressure difference between a suction tap and a tap to a compression chamber prior to discharge to selectively communicate said discharge pressure tap to said housing chamber.

18. A scroll compressor comprising:

a housing defining a housing chamber;

an electric motor received in said housing chamber, said electric motor being provided with a protection device which is actuated when said motor reaches a predetermined temperature to stop rotation of said motor;

a supply of suction fluid, said suction fluid communicating with said housing chamber such that said suction fluid cools said motor;

a first scroll member having a base and a generally spiral wrap extending from said base and a second scroll member having a base and a generally spiral wrap extending from said base, said wraps of said first and second scroll members interfitting to define compression chambers;

said motor driving said first scroll member to orbit relative to said second scroll member; and a vent mounted in said base of said second scroll member, said vent including a valve biased towards a position selectively venting gas directly from an intermediate pressure portion of at least one of said compression chambers to said housing chamber, and said valve being moved to a position blocking venting of gas [if] *when* conditions in a chamber intermediate a suction chamber and a discharge port corresponds to the compressor operating properly.

19. A scroll compressor comprising:

a housing defining a housing chamber;

a first scroll member having a base and a generally spiral wrap extending from said base and a second scroll member having a base and a generally spiral wrap extending from said base, said wraps of said first and second scroll members interfitting to define compression chambers; and a vent mounted in said base of said second scroll member, said vent including a valve biased towards a position selectively venting gas directly from an intermediate pressure portion of at least one of said compression chambers to said housing chamber, and said valve being moved to a position blocking venting of gas [if] *when* conditions in a chamber intermediate a suction chamber and a discharge port corresponds to the compressor operating properly.

20. A scroll compressor as recited in claim 19, wherein said vented gas actuates a motor protection device of an electric motor which drives said first scroll member.

21. A scroll compressor as recited in claim 19, wherein said valve has a first face which is exposed to suction pressure and a second face exposed to a pressure within said at least one compression chamber, a bias member biasing said valve to a position allowing venting, and against a pressure from said at least one said compression chamber.

*22. A compressor comprising:*

*a motor driving compressor elements;*

*a protection device for said motor, said protection device being actuated when a predetermined temperature is exceeded at said motor;*

*a housing for enclosing said motor, said housing defining a housing chamber around said motor;*

*a compression chamber for compressing a refrigerant, and said refrigerant passing through said housing chamber to said compression chamber such that said refrigerant cools said motor; and*

*a vent for selectively communicating a discharge pressure refrigerant which has been compressed in said compression chamber to said housing chamber when conditions in an intermediate pressure chamber at a pressure intermediate a suction pressure and a discharge pressure occur because of a loss of charge in a system associated with said compressor, said vent allowing said discharge pressure refrigerant to move into said housing chamber and contact said motor, and actuate said protection device, and said vent including a valve which has one surface exposed to an intermediate pressure in said intermediate pressure chamber, and an opposed surface exposed to the suction pressure, with a spring biasing said valve in a direction against said intermediate pressure, said valve being biased by said spring towards a position which communicates said discharge pressure refrigerant to said housing chamber, with said intermediate pressure forcing said valve against a force from said spring to a position blocking flow of said discharge pressure refrigerant to said housing chamber.*

*23. A compressor as set forth in claim 22, wherein a tap to said discharge pressure refrigerant extends into a valve chamber from a position outward of an outer peripheral surface of said valve.*

*24. A compressor as set forth in claim 23, wherein said discharge pressure refrigerant does not bias said valve, with said valve being biased by said suction pressure, said intermediate pressure and said spring.*

*25. A compressor as set forth in claim 22, wherein said discharge pressure refrigerant is tapped from a discharge port on said compressor elements.*

*26. A compressor as set forth in claim 22, wherein said compressor elements include a scroll compressor.*

*27. A compressor comprising:*

*a motor for driving a scroll compressor;*

*a protection device for said motor, said protection device being actuated when a predetermined temperature is exceeded at said motor;*

*a housing for enclosing said motor, said housing defining a housing chamber around said motor;*

*a compression chamber for compressing a refrigerant, and said refrigerant passing through said housing chamber to said compression chamber such that said refrigerant cools said motor; and*

*a vent for selectively communicating a discharge pressure refrigerant which has been compressed in said compression chamber to said housing chamber when conditions in an intermediate pressure chamber at a pressure intermediate a suction pressure and a discharge pressure occur because of a loss of charge in a system associated with said compressor, said vent allowing said discharge pressure refrigerant to move into said housing chamber and contact said motor, and actuate said protection device, and said vent including a valve which has one surface exposed to an intermediate pressure in said intermediate pressure chamber, and an opposed surface exposed to the suction pressure, with a spring biasing said valve in a direction against said intermediate pressure, said valve being biased by said spring towards a position which communicates said discharge pressure refrigerant to said housing chamber, with the pressure in said intermediate pressure chamber forcing said valve against a force from said spring to a position blocking flow of said discharge pressure refrigerant to said housing chamber, a tap to said discharge pressure refrigerant extending into a valve chamber for said valve from a position outward of an outer peripheral surface of said valve.*

*28. A compressor comprising:*

*a motor for driving compressor elements;*

*a protection device for said motor, said protection device being actuated when a predetermined temperature is exceeded at said motor;*

*a housing for enclosing said motor, said housing defining a housing chamber around said motor;*

*a compression chamber for compressing a refrigerant, and said refrigerant passing through said housing chamber to said compression chamber such that said refrigerant cools said motor; and*

*a vent for selectively communicating a tapped refrigerant which has been compressed in said compression chamber to said housing chamber when conditions in an intermediate pressure chamber at a pressure intermediate a suction pressure and a discharge pressure occur because of a loss of charge in a system associated with said compressor, said vent allowing said tapped refrigerant to move into said housing chamber and contact said motor, and actuate said protection device, and said vent including a valve which has one surface exposed to an intermediate pressure in said intermediate pressure chamber, and an opposed surface exposed to the suction pressure, with a spring biasing said valve in a direction against said intermediate pressure, said valve being biased by said spring towards a position which communicates said tapped refrigerant to said housing chamber, with said intermediate pressure forcing said valve against a force from said spring to a position blocking flow of said tapped refrigerant to said housing chamber.*

*29. A compressor as set forth in claim 28, wherein said tapped refrigerant is at a discharge pressure.*

*30. A compressor as set forth in claim 28, wherein said compressor is a scroll compressor.*

*31. A compressor comprising:*

*a motor for driving compressor elements;*

*a protection device for said motor, said protection device being actuated when a predetermined temperature is exceeded at said motor;*

*a housing for enclosing said motor, said housing defining a housing chamber around said motor;*

*a compression chamber for compressing a refrigerant, and said refrigerant passing through said housing chamber to said compression chamber such that said refrigerant cools said motor; and*

*a vent for selectively communicating a discharge pressure refrigerant which has been compressed in said compression chamber to said housing chamber when conditions in an intermediate pressure chamber at a pressure intermediate a suction pressure and a discharge pressure occur because of a loss of charge in a system associated with said compressor, said vent allowing said discharge pressure refrigerant at an elevated temperature to move into said housing chamber and contact said motor, and actuate said protection device, and said vent including a valve which has one surface exposed to an intermediate pressure in said intermediate pressure chamber, and an opposed surface exposed to the suction pressure, said discharge pressure refrigerant communicating through a chamber which contains said valve from a position radially outward of an outer peripheral surface of said valve, with said intermediate pressure forcing said valve to a position blocking flow of said discharge pressure refrigerant to said housing chamber.*

* * * * *

UNITED STATES PATENT AND TRADEMARK OFFICE

CERTIFICATE OF CORRECTION

PATENT NO. : RE 40,399 E
APPLICATION NO. : 10/387037
DATED : June 24, 2008
INVENTOR(S) : Hugenroth et al.

It is certified that error appears in the above-identified patent and that said Letters Patent is hereby corrected as shown below:

Claim 1, Column 6, line 42: “rotation” should read as --protection--

Signed and Sealed this

Eleventh Day of November, 2008

JON W. DUDAS
*Director of the United States Patent and Trademark Office*